United States Patent
Hashimoto et al.

(10) Patent No.: US 9,421,495 B2
(45) Date of Patent: Aug. 23, 2016

(54) STRUCTURAL BODY FOR SUPPORTING A CATALYST, AND CATALYTIC CONVERTER

(75) Inventors: Keita Hashimoto, Toyota (JP); Masaru Kakinohana, Toyota (JP); Takeo Kobayashi, Toyota (JP); Tsuyoshi Watanabe, Handa (JP); Yoshiyuki Kasai, Kasugai (JP); Tadato Ito, Komaki (JP)

(73) Assignees: TOYOTA JIDOSHA KABUSHIKI KAISHA, Toyota (JP); NGK INSULATORS, LTD., Nagoya-shi (JP)

( * ) Notice: Subject to any disclaimer, the term of this patent is extended or adjusted under 35 U.S.C. 154(b) by 438 days.

(21) Appl. No.: 14/003,891

(22) PCT Filed: Mar. 12, 2012

(86) PCT No.: PCT/JP2012/056333
§ 371 (c)(1),
(2), (4) Date: Sep. 9, 2013

(87) PCT Pub. No.: WO2012/128112
PCT Pub. Date: Sep. 27, 2012

(65) Prior Publication Data
US 2014/0004014 A1    Jan. 2, 2014

(30) Foreign Application Priority Data
Mar. 23, 2011   (JP) ................. 2011-064610

(51) Int. Cl.
*F01N 3/20* (2006.01)
*B01D 53/94* (2006.01)
*F01N 3/28* (2006.01)
(Continued)

(52) U.S. Cl.
CPC ............... *B01D 53/94* (2013.01); *B01D 53/88* (2013.01); *B01J 35/002* (2013.01); *B01J 35/04* (2013.01); *F01N 3/2026* (2013.01); *F01N 3/2842* (2013.01); *B01D 2255/1021* (2013.01); *B01D 2255/1023* (2013.01); *B01D 2255/1025* (2013.01); *B01J 23/42* (2013.01);
(Continued)

(58) Field of Classification Search
None
See application file for complete search history.

(56) References Cited

U.S. PATENT DOCUMENTS 5,245,825 A   9/1993   Ohhashi et al.
5,852,285 A   12/1998  Kato et al.

FOREIGN PATENT DOCUMENTS

EP   0572827 A1   12/1993
JP   A 4-280086   10/1992
(Continued)

OTHER PUBLICATIONS

Morofushi et al. (JPH05115796A)—machine translated document (1993).*

*Primary Examiner* — Walter D Griffin
*Assistant Examiner* — Jelitza Perez
(74) *Attorney, Agent, or Firm* — Oliff PLC

(57) ABSTRACT

To provide a catalytic converter that reduces non-uniformity of temperature of a catalyst support and that can approach a uniform temperature distribution, and a structural body for supporting a catalyst that structures this catalytic converter. At a catalyst support, gradually decreasing width portions, at which a width thereof gradually decreases toward electrode centers, are formed at regions where electrodes, are contactingly disposed, as seen in a cross-section orthogonal to a direction in which exhaust flows. The width is shorter than a length of a center line at a given position. Heat generation and heat dissipation of the catalyst support are balanced overall.

11 Claims, 6 Drawing Sheets

(51) Int. Cl.
B01D 53/88 (2006.01)
B01J 35/00 (2006.01)
B01J 35/04 (2006.01)
  B01J 23/42 (2006.01)
  B01J 23/44 (2006.01)
  B01J 23/46 (2006.01)
(52) U.S. Cl.
  CPC ............... *B01J 23/44* (2013.01); *B01J 23/464* (2013.01); *Y02T 10/26* (2013.01)

(56) References Cited

FOREIGN PATENT DOCUMENTS

| JP | 05115796 A | * | 5/1993 |
| JP | A 5-115795 | | 5/1993 |
| JP | A 5-115796 | | 5/1993 |
| JP | A 9-103684 | | 4/1997 |

* cited by examiner

STRUCTURAL BODY FOR SUPPORTING A CATALYST, AND CATALYTIC CONVERTER

TECHNICAL FIELD

The present invention relates to a catalytic converter that is provided at the exhaust pipe of an internal combustion engine, and to a structural body for supporting a catalyst that structures this catalytic converter.

BACKGROUND ART

In a catalytic converter that is provided at an exhaust pipe in order to purify the exhaust generated at an internal combustion engine, it is desirable to supply electricity to a catalyst support, that is formed of metal and supports a catalyst, and raise the temperature of the catalyst support so as to obtain a sufficient catalytic effect. For example, when electricity is supplied to a catalyst support (base material), whose cross-section orthogonal to the direction in which the exhaust flows is circular, by a pair of electrodes that are affixed to opposing positions with this catalyst support therebetween, the cross-sectional surface area in the direction in which the current flows differs greatly in the vicinity of the electrodes and at the center of the catalyst support. Therefore, a large difference arises in the current density as well, and it is easy for non-uniformity of the amount of heat that is generated to arise.

In contrast, for example, Patent Document 1 discloses a catalyst support whose cross-section orthogonal to the direction in which the exhaust flows is quadrilateral. At this catalyst support, the sectional surface area of the flow of current is uniform, and therefore, it is difficult for the aforementioned non-uniformity of the generated amount of heat to arise. However, when the heat dissipation from the electrodes becomes large, the balance between heat generation and heat dissipation collapses, and the temperature difference within the catalyst support becomes large.

Patent Document 1: Japanese Patent Application Laid-Open No. 4-280086

DISCLOSURE OF INVENTION

Technical Problem

In view of the above-described circumstances, the topic of the present invention is to provide a catalytic converter that reduces non-uniformity of temperature of a catalyst support and that can approach a uniform temperature distribution, and a structural body for supporting a catalyst that structures this catalytic converter.

Solution to Problem

A first aspect of the present invention comprises: a catalyst support that is heated due to electricity being supplied thereto, and through which exhaust can pass in a predetermined direction; a pair of electrodes that are disposed so as to contact the catalyst support at opposing positions with the catalyst support therebetween, as seen in an orthogonal cross-section that is orthogonal to a direction in which the exhaust flows; gradually decreasing width portions that are formed at the catalyst support and whose widths, in a direction orthogonal to an electrode center line that connects respective centers of the electrodes as seen in the orthogonal cross-section, gradually decrease toward electrode centers at regions contacted by the electrodes; and a wide width portion at which a region, that is not contacted by the electrodes, of the catalyst support is made to have a wider width than the gradually decreasing width portions as seen in the orthogonal cross-section, and at which a width $W_1$ of a maximum width portion, at which a width of the region is a maximum, is shorter than a length $L_1$ of the center line.

At the structural body for supporting a catalyst, when electricity is supplied to the catalyst support by the pair of electrodes that are disposed so as to contact the catalyst support, the catalyst support is heated and the temperature thereof is raised. For example, when a catalyst is supported by the catalyst support, the purifying effect due to the catalyst can be exhibited at an earlier stage.

The electrodes are provided at opposing positions with the catalyst support therebetween, as seen in an orthogonal cross-section that is orthogonal to the direction in which exhaust flows. Therefore, the catalyst support can be heated uniformly, as compared with a structure in which electrodes are not disposed opposingly in this way.

Moreover, considering the width in the direction orthogonal to the electrode center line that connects the centers of the respective electrodes as seen in the orthogonal cross-section, gradually decreasing width portions, at which the width gradually decreases toward the electrode centers, are formed at the catalyst support at the regions that are contacted by the electrodes. Moreover, the region of the catalyst support, which region is not contacted by the electrodes, is made to be a wide portion whose width is wider than the gradually decreasing width portions. Namely, the gradually decreasing width portions have narrower widths than the wide width portion. At the regions of the catalyst support which regions are contacted by the electrodes, heat is dissipated from the catalyst support through the electrodes. However, because the gradually decreasing width portions have narrow widths, the sectional surface areas of the portions through which the current flows are small, and the current density is high, and the amount of heat that is generated is also large. Therefore, the generation of heat at the gradually decreasing width portions is balanced with the heat dissipation from the electrodes.

Further, at the wide width portion, the width $W_1$ of the maximum width portion, at which the width is a maximum at the region that is not contacted by the electrodes, is shorter than the length $L_1$ of the center line. By restricting (setting an upper limit of) the width $W_1$ of the maximum width portion in this way, the sectional surface area of the flow of current between the electrodes also is limited. Namely, because a local decrease in the current density is suppressed at the wide width portion, the amounts of heat generated at the respective regions of the catalyst support are made uniform.

In this way, in the present invention, by balancing the heat generation and the heat dissipation of the catalyst support, non-uniformity of temperature is reduced at the catalyst support overall, and it is possible to approach a uniform temperature distribution.

In a second aspect of the present invention, in the first aspect, the width $W_1$ of the maximum width portion is less than or equal to 93% of the length $L_1$.

By making the width $W_1$ of the maximum width portion be less than or equal to 93% of the length $L_1$ of the center line in this way, the sectional surface area of the flow of the current between the electrodes approaches uniform more, and therefore, the generation of heat at the respective regions of the catalyst support can be made to be uniform.

Note that the lower limit value of the width $W_1$ of the maximum width portion is not particularly limited from the standpoint of making the generation of heat uniform as described above, but, if the width $W_1$ is too small, it becomes difficult to maintain the strength of the catalyst support.

Moreover, an exhaust pipe, that is the object of installation of the catalytic converter, is generally cylindrical tube shaped (has a circular cross-section). Therefore, the mountability of a narrow catalyst support to an exhaust pipe deteriorates. From these standpoints, it is preferable that the lower limit of the width W1 of the maximum width portion be 77% with respect to the length L1 of the center line.

In a third aspect of the present invention, in the first or second aspect, the gradually decreasing width portions are formed in curved shapes that are convex toward the electrode sides as seen in the orthogonal cross-section.

By forming the gradually decreasing width portions in curved shapes in this way, mounting to a pipe that is formed in a cylindrical tube shape is easy.

In a fourth aspect of the present invention, in any one of the first through third aspects, the catalyst support is formed in a shape of an oval whose long axis is the center line as seen in the orthogonal cross-section.

By forming the catalyst support in the shape of an oval as seen in the orthogonal cross-section, there are no corner portions at the catalyst support, and therefore, localized heat dissipation can be suppressed.

In a fifth aspect of the present invention, in any one of the first through fourth aspects, the maximum width portion of the catalyst support is formed at an entirety of a portion other than the gradually decreasing width portions.

The maximum width portion exists over a predetermined length along the direction of the center line, at the region other than the gradually decreasing width portions. Therefore, the heat generation of the catalyst support can be made to approach more uniform.

In a sixth aspect of the present invention, in any one of the first through fifth aspects, the catalyst support is formed in a shape that is symmetrical across the center line as seen in the orthogonal cross-section.

In a seventh aspect of the present invention, in any one of the first through sixth aspects, the catalyst support is formed in a shape that is symmetrical across a perpendicular bisector of the center line as seen in the orthogonal cross-section.

By forming the catalyst support in a symmetrical shape, non-uniformity of temperature is reduced, and it is possible to approach a uniform temperature distribution.

An eight aspect of the present invention has: the structural body for supporting a catalyst of any one of the first through seventh aspects; and a catalyst that is supported by the catalyst support of the structural body for supporting a catalyst, and is for purifying exhaust that is discharged from an internal combustion engine.

Because a catalyst is supported by the catalyst support, harmful substances within the exhaust can be purified by the catalyst.

Because it has the structural body for supporting a catalyst of any one of the first through seventh aspects, by balancing the heat generation and the heat dissipation of the catalyst support, non-uniformity of temperature is reduced at the entire catalyst support, and it is possible to approach a uniform temperature distribution.

Advantageous Effects of Invention

Because the present invention has the above-described structure, non-uniformity of temperature of the catalyst support is reduced, and it is possible to approach a uniform temperature distribution.

BEST MODES FOR CARRYING OUT THE INVENTION

Figure 1A:
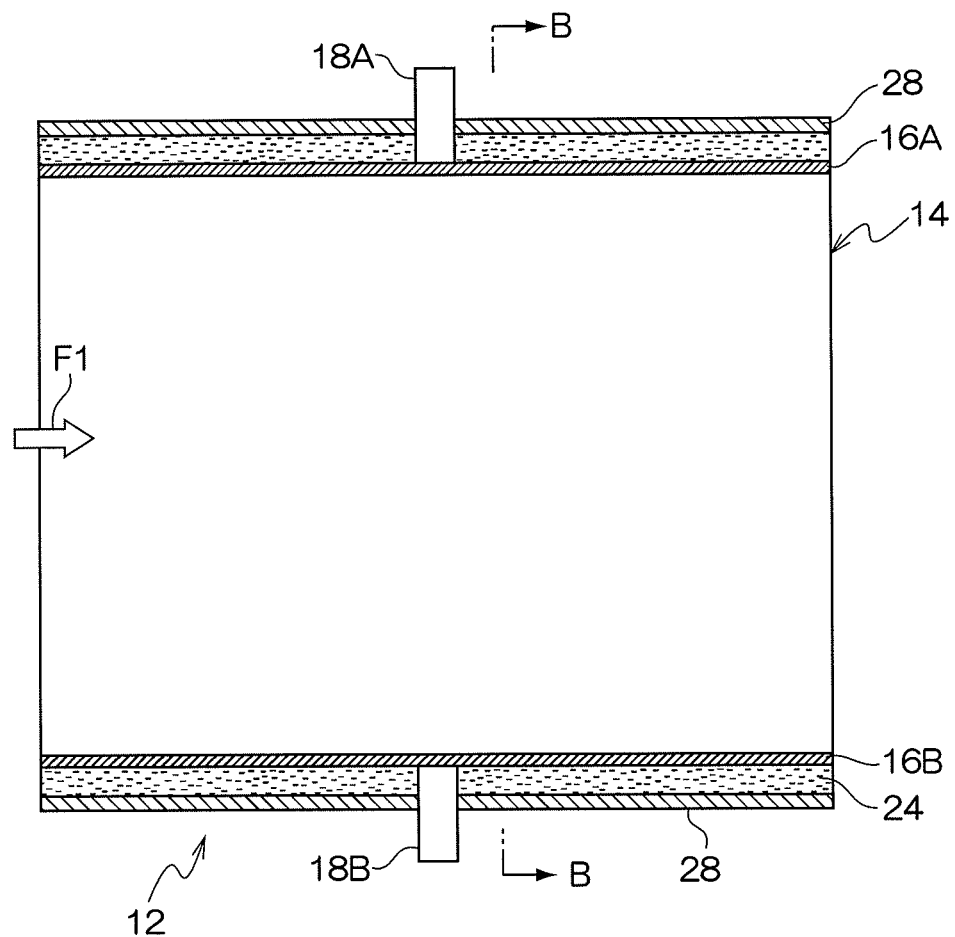
FIG. 1A is a cross-sectional view showing a catalytic converter of a first embodiment of the present invention, in a cross-section along a direction in which exhaust flows.
Figure 1B:
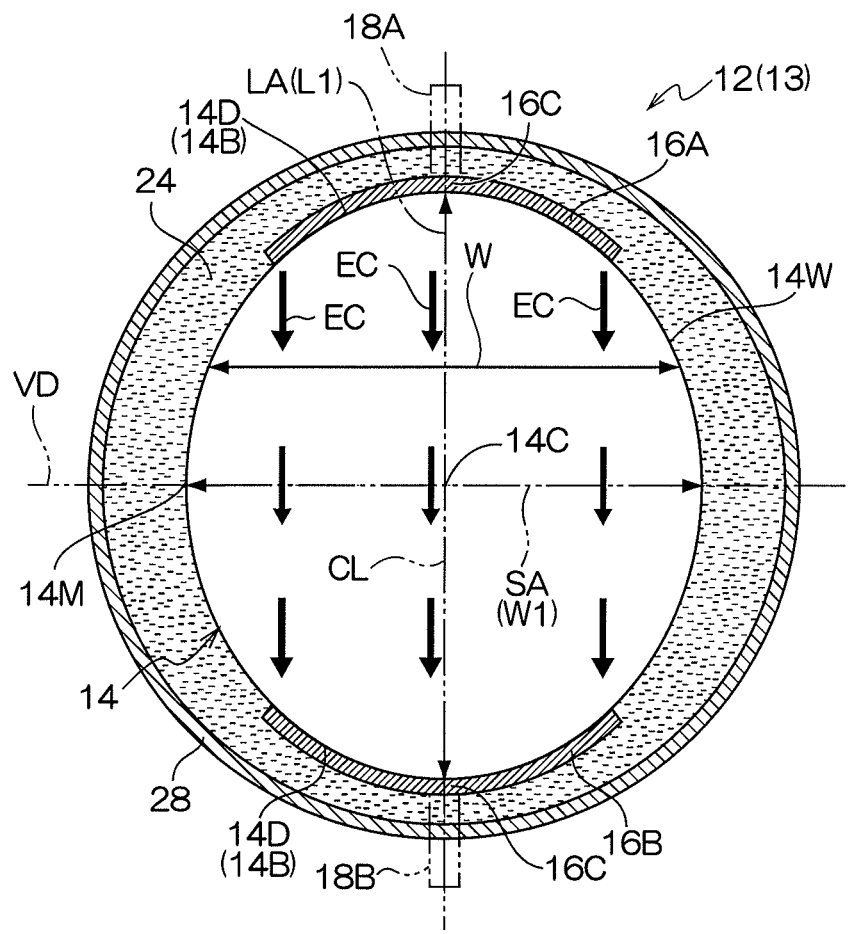
FIG. 1B is a cross-sectional view showing the catalytic converter of the first embodiment of the present invention, in a cross-section orthogonal to the direction in which exhaust flows.

A catalytic converter 12 of a first embodiment of the present invention is shown in FIG. 1A. The catalytic converter 12 is installed along an exhaust pipe. Exhaust from an engine flows within the exhaust pipe. FIG. 1B illustrates the catalytic converter 12 in a cross-section in the direction orthogonal to the direction in which this exhaust flows (a cross-section along line B-B of FIG. 1A).

As shown in FIG. 1, the catalytic converter 12 has a catalyst support 14 that is formed of a material that is electrically conductive and rigid. The surface area of the material of the catalyst support 14 is enlarged by forming the catalyst support 14 in, for example, a honeycomb shape. A catalyst (platinum, palladium, rhodium, or the like) is supported in a state of adhering to the surfaces of the catalyst support 14. The catalyst has the effect of purifying harmful substances within the exhaust that flows within the exhaust pipe (the flowing direction is shown by arrow F1). Note that the structure for increasing the surface area of the surfaces of the catalyst support 14 is not limited to the aforementioned honeycomb shape, and may be wave-shaped or the like for example. However, from the standpoint of structural durability, a honeycomb-shaped structure is preferable.

A conductive ceramic, a conductive resin, a metal or the like can be used as the material that structures the catalyst support 14, but, in the present embodiment, in particular, a conductive ceramic is used. Making the material that structures the catalyst support 14 contain at least silicon carbide for example is preferable because high-strength and heat resistance are obtained. From the standpoint of the ease of adjusting the porosity, a material that contains at least silicon carbide and metal silicon is most preferable. Moreover, making the electrical resistivity be 10 to 200 Ω·cm is preferable because the temperature of the catalyst that is supported can be raised efficiently at the time of supplying electricity as will be described later. Making the porosity of the catalyst support be in the range of 30 to 60% is preferable. If the porosity is made to be greater than or equal to 30%, the needed surface area of the surfaces is ensured, and more catalyst can be supported. Further, by making the porosity be less than or equal to 60%, the strength required of the catalyst support 14 can be maintained.

Two electrodes 16A, 16B are affixed to the catalyst support 14, and further, terminals 18A, 18A are connected to the centers of the electrodes 16A, 16B respectively. The electrodes 16A, 16B are disposed so as to contact the catalyst support 14 at a range having a predetermined expanse along the outer peripheral surface of the catalyst support 14. The catalyst support 14 can be heated due to electricity being supplied to the catalyst support 14 from the terminals 18A, 18B through the electrodes 16A, 16B. Further, by raising the temperature of the catalyst, that is supported by the catalyst support 14, due to this heating, the exhaust purifying effect that the catalyst has can be exhibited better.

In the present embodiment, as can be understood from FIG. 1B, the catalyst support 14 is an oval shape as seen in a cross-section orthogonal to the direction in which the exhaust flows. Further, the electrodes 16A, 16B are disposed at opposing positions with the catalyst support 14 therebetween, such that the respective central portions (electrode centers 16C) of the electrodes 16A, 16B are positioned on a long axis LA of this oval.

Here, a center line CL is set as a line segment that connects the electrode centers 16C of the electrodes 16A, 16B, and a width W is defined as the length of the catalyst support 14 measured in the direction orthogonal to this center line CL. At this time, the center line CL coincides with the long axis LA of the catalyst support 14 that is formed in an oval shape. Further, a perpendicular bisector VD of the center line CL coincides with a short axis SA of the catalyst support 14.

The catalyst support 14 is a shape that has left-right symmetry in FIG. 1B across the center line CL (the long axis LA). Moreover, the catalyst support 14 is a shape that similarly has top-bottom symmetry in FIG. 1B across the perpendicular bisector VD (the short axis SA). At the region where the electrodes 16A, 16B are contactingly disposed, the width W of the catalyst support 14 gradually decreases from a center 14C (the point of intersection of the long axis LA and the short axis SA) side of the catalyst support 14 toward the electrode centers 16C of the electrodes 16A, 16B, and gradually decreasing width portions 14D relating to the present invention are formed. In particular, in the present embodiment, the portions where the electrodes 16A, 16B are affixed are portions where the surface of the catalyst support 14 is oval as seen in cross-section, and are curved surface portions 14B that curve convexly toward the electrode 16A or the electrode 16B. In contrast, the region where the electrodes 16A, 16B are not disposed contactingly has a wider width overall than the regions where the electrodes 16A, 16B are contactingly disposed, and is a wide width portion 14W relating to the present invention.

Moreover, because the catalyst support 14 of the present embodiment is formed in an oval shape, the width W at an arbitrary position is shorter than a length L1 of the center line CL (the long axis LA). Further, at the short axis SA of the catalyst support 14, the width becomes a maximum (this maximum width is W1), and a maximum width portion 14M relating to the present invention is structured.

In the present embodiment, the shape of the catalyst support 14 is determined such that the maximum width (the length of the short axis SA) W1, with respect to the length between the electrode centers 16C (the length of the long axis LA) L1, is 77% to 93%, and preferably in the range of 77% to 85%.

A holding member 24, that is formed in a cylindrical tube shape and of an insulating material, is disposed at the outer periphery of the catalyst support 14. Moreover, a case cylinder 28, that is molded in a cylindrical tube shape of a metal such as stainless steel or the like, is disposed at the outer periphery of the holding member 24. Namely, the catalyst support 14 is accommodated at the interior of the case cylinder 28 that is cylindrical tube shaped, and the catalyst support 14 is held at the interior of the case cylinder 28 without a gap by the holding member 24 that is disposed between the case cylinder 28 and the catalyst support 14. Further, because the holding member 24 that is insulating is disposed between the catalyst support 14 and the case cylinder 28, flow of electricity from the catalyst support 14 toward the case cylinder 28 is prevented.

The thus-structured catalytic converter 12, which is in a state in which a catalyst is not supported by the catalyst support 14, is a structural body 13 for supporting a catalyst of the present invention. In other words, a structure in which the catalyst support 14 of the structural body 13 for supporting a catalyst is made to support a catalyst is the catalytic converter 12.

Operation of the catalytic converter 12 of the present embodiment is described next.

The case cylinder 28 of the catalytic converter 12 is mounted midway along an exhaust pipe, and exhaust passes through the interior of the catalyst support 14 in the arrow F1 direction. At this time, harmful substances within the exhaust are purified by the catalyst that is supported by the catalyst support 14. At the catalytic converter 12 of the present embodiment, electricity is supplied to the catalyst support 14 by the terminals 18A, 18B and the electrodes 16A, 16B, and the catalyst support 14 is heated, and, due thereto, the temperature of the catalyst that is supported by the catalyst support 14 is raised. By raising the temperature of the catalyst in this way, the purifying effect of the catalyst can be exhibited better. In cases in which the temperature of the exhaust is low, such as immediately after start-up of the engine or the like for example, by supplying electricity to and heating the catalyst support 14 in advance, the purifying performance of the catalyst in the initial stage of engine start-up can be ensured.

At the catalytic converter 12 of the present embodiment, the catalyst support 14 is formed in an oval shape as seen in a cross-section orthogonal to the direction in which the exhaust flows, and the maximum width W1 is shorter than the length L1 between the electrode centers 16C of the electrodes 16A, 16B.

Figure 2:
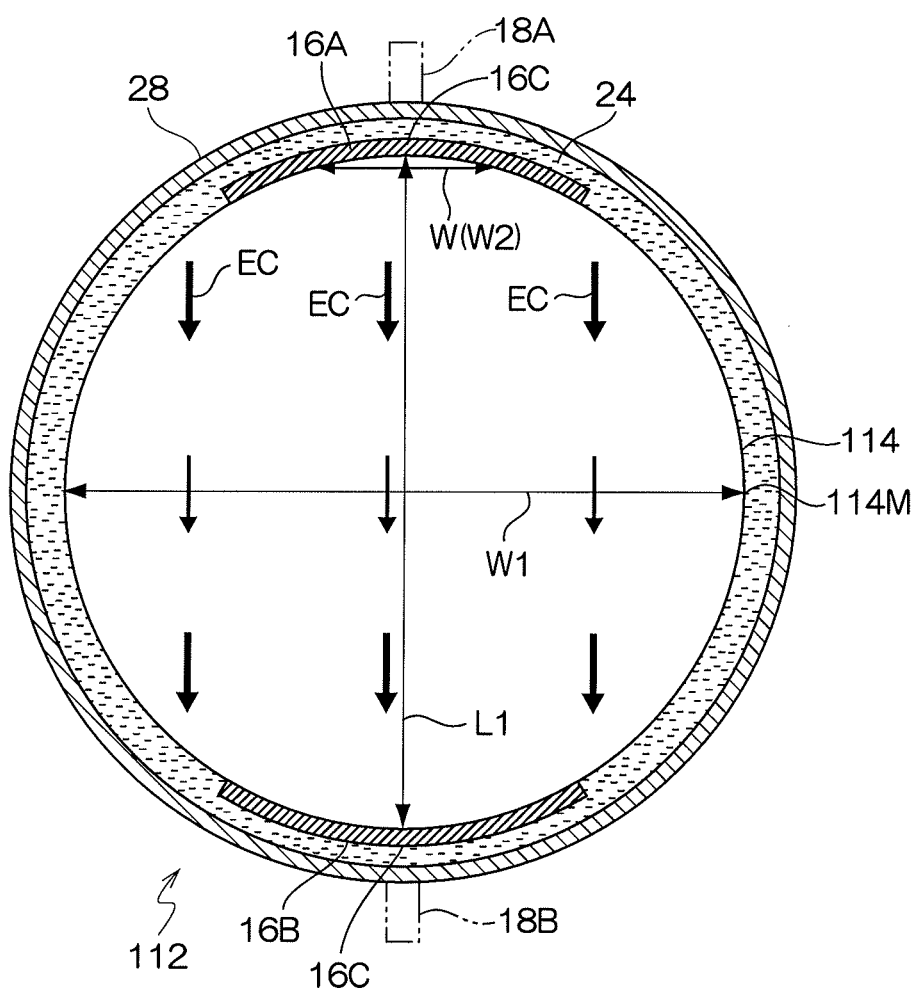
FIG. 2 is a cross-sectional view showing a catalytic converter of a comparative example, in a cross-section orthogonal to a direction in which exhaust flows.

Here, as shown in FIG. 2, a catalytic converter 112 of a first comparative example, that has a catalyst support 114 that is circular as seen in a cross-section orthogonal to the direction in which the exhaust flows, is supposed. In the catalytic converter 112 of this first comparative example, because the cross-sectional shape of the catalyst support 114 is circular, the length L1 of the center line CL that connects the electrode centers 16C of the electrodes 16A, 16B, and the maximum width W1 at a maximum width portion 114M, match.

Accordingly, at the catalytic converter 112 of the first comparative example, the difference between the width W (shown as W2 in particular) in the vicinities of the electrodes 16A, 16B, and the width W (maximum width W1) at the maximum width portion 114M, is large. When considering that the current between the electrodes 16A, 16B flows as shown by arrows EC, the sectional surface area with respect to the flow of the current is relatively narrow in the vicinities of the electrodes 16A, 16B, and is relatively wide at the maximum width portion 114M. Namely, at the maximum width portion 114M, the current density is relatively small as compared with in vicinities of the electrodes 16A, 16B, and therefore, the amount of heat generated at the maximum width portion 114M also is relatively small as compared with the vicinities of the electrodes 16A, 16B. Accordingly, in the catalytic converter 112 of the first comparative example, there is the tendency for the temperature of the maximum width portion 114M to easily become lower, as compared with in the vicinities of the electrodes 16A, 16B.

In contrast, in the catalytic converter 12 of the present embodiment, the catalyst support 14 is formed in an oval shape as seen in cross-section, and the maximum width W1 is shorter than the length L1 of the center line CL. Accordingly, as compared with the catalytic converter 112 of comparative example 1, the amount of reduction in the sectional surface area of the flow of current at the maximum width portion 14M is small, and the amount of decrease in the current density also is small. Therefore, in the catalytic converter 12 of the first embodiment, uniformizing of the amount of heat generated at the catalyst support 14 is devised as compared with the catalytic converter 112 of the first comparative example.

Figure 3:
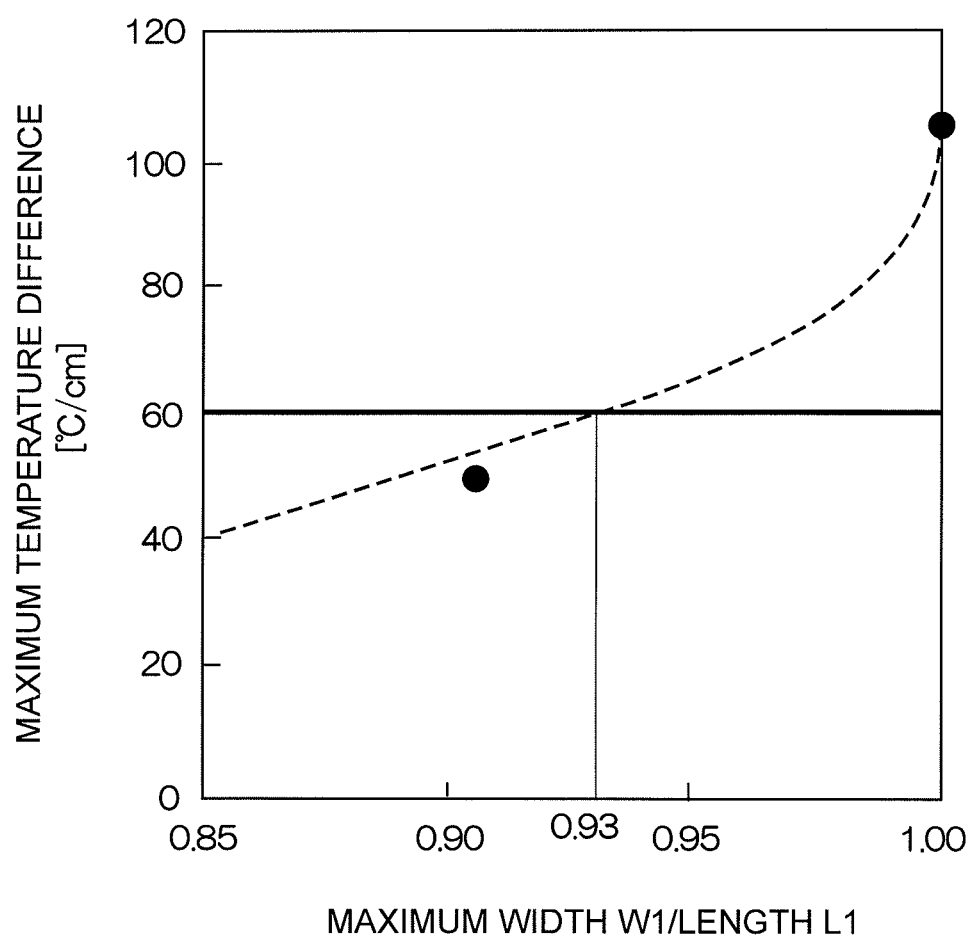
FIG. 3 is a graph showing the relationship between maximum width W1/length L1 and maximum temperature difference (temperature gradient), at a catalyst support of the catalytic converter.

The relationship between the ratio (W1/L1) of the maximum width W1 with respect to the length L1 of the center line CL of the catalyst support 14, and the maximum temperature difference within the catalyst support 14, is shown in FIG. 3. When viewed in the cross-section shown in FIG. 1B, this maximum temperature difference is the temperature difference between the highest temperature region and the lowest temperature region at the time of heating of the catalyst support 14, divided by the distance between these regions (the temperature gradient). Accordingly, the lower this value, the more that uniformizing of the temperature of the catalyst support 14 is devised.

Here, generally, from the standpoint of uniformizing the temperature of the interior of the catalyst support 14, the maximum temperature difference is less than or equal to 60° C./cm, and further, less than or equal to 40° C./cm is preferable. Further, from the graph of FIG. 3, it can be understood that, if the value of maximum width W1/length L1 is less than or equal to 93%, the above-described maximum temperature difference of less than or equal to 60° C./cm can be realized, and further, if the value is made to be 85%, the above-described maximum temperature difference of less than or equal to 40° C./cm can be realized.

Note that, from these standpoints, there is no lower limit value of maximum width W1/length L1. However, if the width W1 becomes too small, there is the concern that it will be difficult to maintain the strength of the catalyst support 14. Further, an exhaust pipe, that is the object of installation of the catalytic converter 12, is generally cylindrical tube shaped, and, in accordance therewith, the case cylinder 28 also is cylindrical tube shaped. Therefore, if the maximum width W1 is small, the gap between the case cylinder 28 and the catalyst support 14 is large. In order to fill-in this gap, the need arises in actuality to make the holding member 24 thicker-walled, or to change a portion of the shape of the case cylinder 28, and the mountability (the ease of mounting) to the exhaust pipe deteriorates. From this standpoint, it is preferable for the value of maximum width W1/length L1 to be greater than or equal to 77%.

Further, as can be understood from FIG. 1B, at the catalyst support 14, the regions where the electrodes 16A, 16B are contactingly disposed are the gradually decreasing width portions 14D where the width W gradually decreases toward the electrode centers 16C. Moreover, at the catalyst support 14, the region at which the electrodes 16A, 16B are not disposed contactingly is the wide width portion 14W whose width is wider than the gradually decreasing width portions 14D. At the regions where the electrodes 16A, 16B are contactingly disposed, there are cases in which the heat of the catalyst support 14 is dissipated via the electrodes 16A, 16B, and further via the terminals 18A, 18B. This heat dissipation can become a cause of a local (at the regions in the vicinities of the electrodes 16A, 16B) decrease in temperature of the catalyst support 14. However, in the catalytic converter 12 of the present embodiment, the gradually decreasing width portions 14D, that are the regions at which the electrodes 16A, 16B are contactingly disposed, have narrower widths than the wide width region 14W that is the region at which the electrodes 16A, 16B are not contactingly disposed, and the current density at the gradually decreasing width portions 14D is relatively higher than the current density of the wide width portion 14W. Namely, at the gradually decreasing width portions 14D, a large amount of heat is generated, and this compensates for a portion of the amount of heat dissipated from the electrodes 16A, 16B. Therefore, also at the regions where the electrodes 16A, 16B are contactingly disposed, heat dissipation and heat generation are in balance, and uniformizing of temperature is devised.

In particular, in the present embodiment, not only do the gradually decreasing width portions 14D simply have narrower widths than the wide width portion 14W, but also, the gradually decreasing width portions 14D are made to be shapes at which the widths gradually decrease toward the electrode centers 16C. The terminals 18A, 18B are connected to the positions of the electrode centers 16C in respective correspondence with the electrodes 16A, 16B, and therefore, heat dissipation via the terminals 18A, 18B also arises, and it is easy for the temperature of the catalyst support 14 to fall. Namely, toward the regions (the electrode centers 16C) where it is supposed that the decrease in temperature due to heat dissipation is marked, the width W of the catalyst support 14 becomes narrow, and the current density is made to be higher. Therefore, heat dissipation and heat generation can be more effectively kept in balance.

In this way, in the present embodiment, at both the regions where the electrodes 16A, 16B are contactingly disposed and the region where they are not contactingly disposed, non-uniformity of the temperature of the catalyst support 14 is reduced, and it is possible to approach a uniform temperature distribution.

Figure 4:
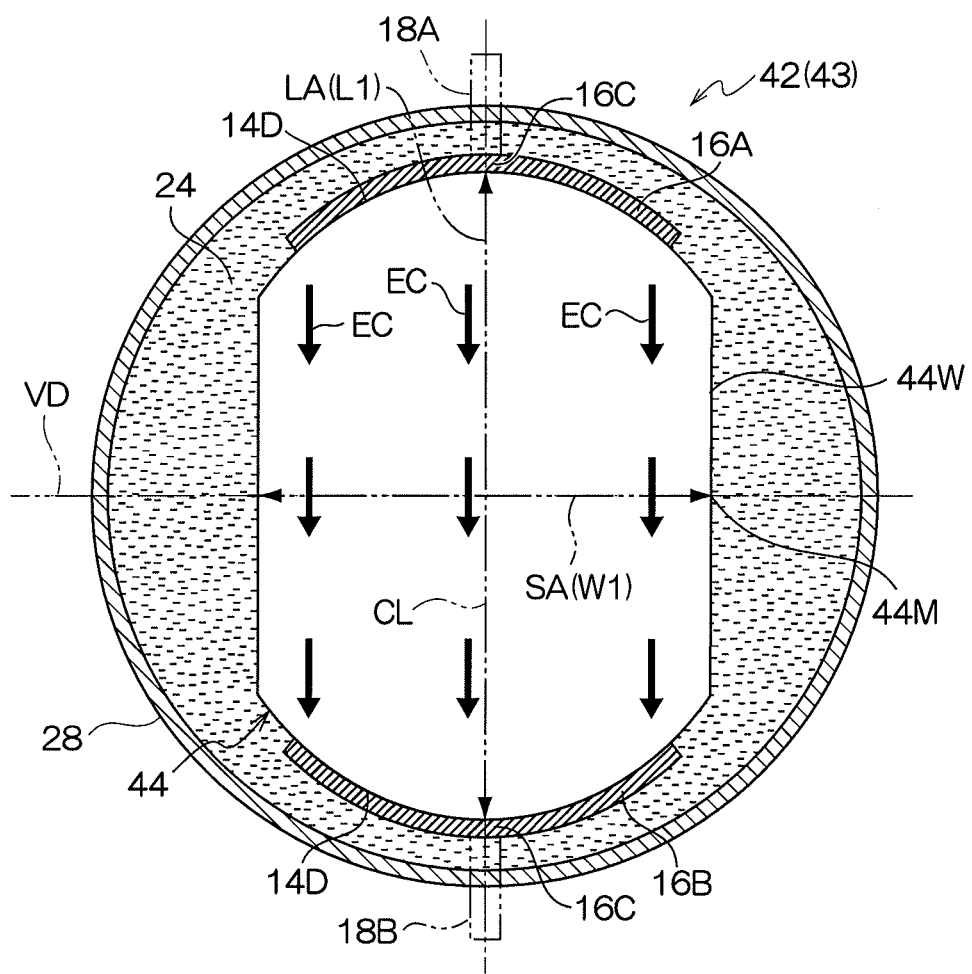
FIG. 4 is a cross-sectional view showing a catalytic converter of a second embodiment of the present invention, in a cross-section orthogonal to a direction in which exhaust flows.

A catalytic converter 42 of a second embodiment of the present invention is shown in FIG. 4. Hereinafter, structural elements, members, and the like that are similar to those of the catalytic converter 12 of the first embodiment are denoted by the same reference numerals, and detailed description thereof is omitted.

At a catalyst support 44 relating to the second embodiment, as seen in a cross-section orthogonal to the direction in which the exhaust flows, a wide width portion 44W is formed rectilinearly. Namely, the wide width portion 44W is parallel to the center line CL, and the entire wide width portion 44W is a maximum width portion 44M of the present invention. In other words, the maximum width portion 44M is formed at a predetermined range (expanse) in the direction along the center line CL, at the entire portion other than the gradually decreasing width portions 14D.

It should also be noted that the catalytic converter 42 of the second embodiment, which is in a state in which a catalyst is not supported by the catalyst support 44, is a structural body 43 for supporting a catalyst of the present invention.

Also in the catalytic converter 42 of the second embodiment that has this structure, in the same way as in the catalytic converter 12 of the first embodiment, the maximum width W1 of the maximum width portion 44M is shorter than the length L1 of the center line CL, and the amount of decrease in the current density at the maximum width portion 44M also is low. Therefore, as compared with the catalytic converter 112 of the first comparative example, at the catalytic converter 42 of the second embodiment, uniformizing of the amount of heat generated at the wide width portion 44W of the catalyst support 44 is devised. In the second embodiment in particular, because the maximum width portion 44M is formed at a predetermined range in the direction along the center line CL, as compared with the catalytic converter 12 of the first embodiment, uniformizing of the current density is devised in a wider range, and the generation of heat can be made uniform.

Further, at the gradually decreasing width portions 14D, a large amount of heat is generated, and this compensates for a portion of the amount of heat dissipated from the electrodes 16A, 16B. Therefore, also at the regions where the electrodes 16A, 16B are contactingly disposed, heat dissipation and heat generation can be set in balance.

Note that, as compared with the catalyst support 44 of the second embodiment that has this shape, at the catalyst support 14 of the first embodiment, the outer peripheral surface of the catalyst support 14 is structured overall by a smooth curved line (in actuality, a curved surface) in the cross-section shown in FIG. 1B, and corner portions do not exist at the outer peripheral surface. Accordingly, at the catalyst support 14 of the first embodiment, heat dissipation from such corner portions can be suppressed.

Further, the catalyst support 14 of the first embodiment is formed in an oval shape overall, and is a shape that is closer to a circle. Accordingly, it is often the case that the mountability of the catalytic converter 12 of the first embodiment to an exhaust pipe is superior to that of the catalytic converter 42 of the second embodiment.

Figure 5:
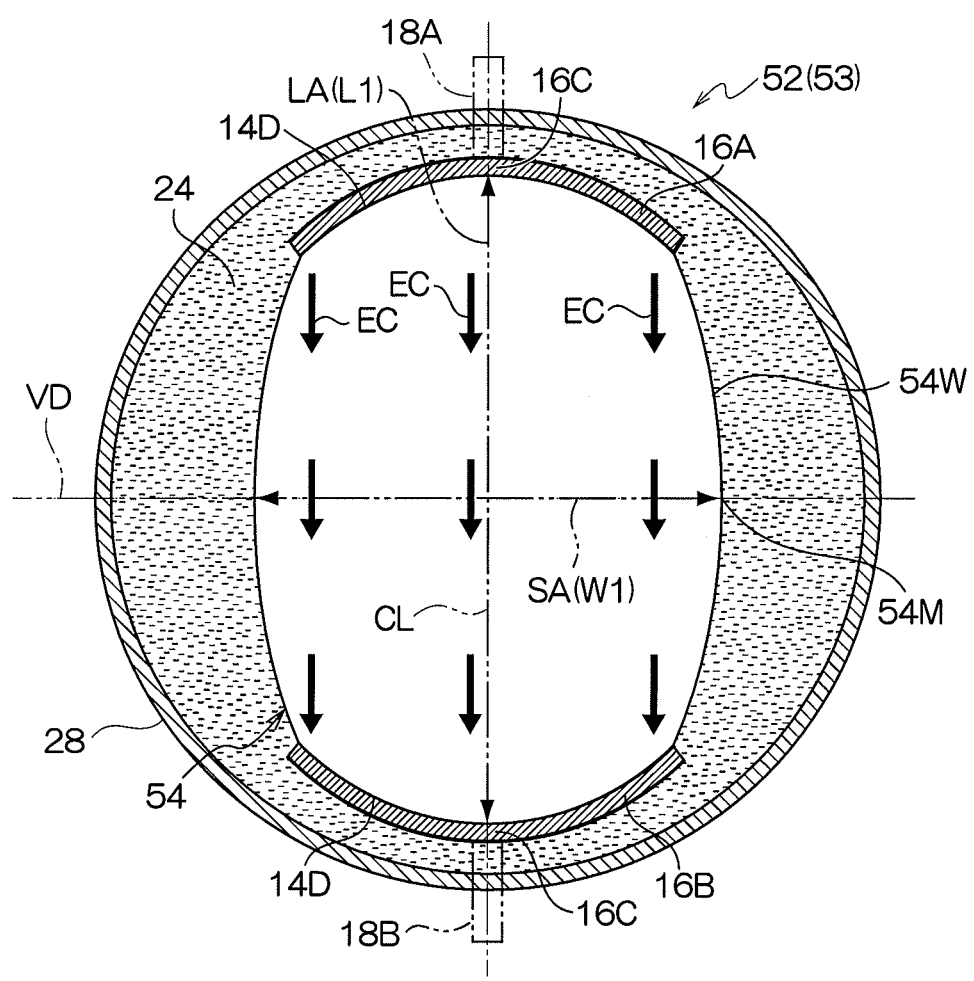
FIG. 5 is a cross-sectional view showing a catalytic converter of a third embodiment of the present invention, in a cross-section orthogonal to a direction in which exhaust flows.

Note that, from this standpoint, a catalyst support 54, at which the shape of a wide width portion 54W is different than those of the catalyst supports 14, 44 of the above-described respective embodiments, may be used such as a catalytic converter 52 of a third embodiment that is shown in FIG. 5. Further, the catalytic converter 52 of the third embodiment, which is in a state in which a catalyst is not supported by the catalyst support 54, is a structural body 53 for supporting a catalyst of the present invention.

At the catalyst support 54 relating to the third embodiment, the wide width portion 54W curves toward the outer side at a predetermined curvature, and is shaped such that a maximum width portion 54M is positioned on the perpendicular bisector VD. The curvature of this wide width portion 54W is smaller than the curvature of the wide width portion 14W relating to the first embodiment, but is a shape that is not rectilinear (planar) as is the wide width portion 44W relating to the second embodiment. Accordingly, in the catalytic converter 52 of the third embodiment, as compared with the catalytic converter 12 of the first embodiment, uniformizing of the amount of heat generated at the wide width portion 54W of the catalyst support 54 can be devised. Further, as compared with the catalytic converter 42 of the second embodiment, because the shape is near to a circle, the mountability to an exhaust pipe is excellent.

In all of the above-described embodiments, the catalyst supports 14, 44, 54 are made to be shapes that have left-right symmetry across the center line CL, and are made to be shapes that have top-bottom symmetry across the perpendicular bisector VD of the center line CL. By making the catalyst supports 14, 44, 54 be symmetrical shapes in this way, the catalyst supports 14, 44, 54 have more uniform temperature distributions, as compared with structures that are not symmetrical shapes.

Further, in the above-described respective embodiments, the curved surface portions 14B, that curve in substantial arc shapes in the cross-section orthogonal to the direction in which the exhaust flows, are given as examples of the shape of the gradually decreasing width portions relating to the present invention. However, the gradually decreasing width portions may be formed in shapes that are rectilinear or step-shaped in cross-section, and may be shapes at which the width of the catalyst support gradually decreases toward the electrode centers 16C.

The invention claimed is:

1. A structural body for supporting a catalyst, comprising:
a porous catalyst support that is heated due to electricity being supplied thereto, and through which exhaust can pass in a predetermined direction;
a pair of electrodes that are disposed so as to contact the porous catalyst support at opposing positions with the porous catalyst support therebetween, as seen in an orthogonal cross-section that is orthogonal to a direction in which the exhaust flows;
gradually decreasing width portions that are formed at the porous catalyst support and whose widths, in a direction orthogonal to an electrode center line that connects respective centers of the electrodes as seen in the orthogonal cross-section, gradually decrease toward electrode centers at which a decrease in temperature is caused by heat dissipation at regions contacted by the electrodes, such that a current density is made higher; and
a wide portion at which a region of the porous catalyst support that is not contacted by the electrodes is made to have a larger width overall than the gradually decreasing width portions as seen in the orthogonal cross-section, the current density at the wide portion being smaller than the current density at the gradually decreasing width portions, and a width of a maximum width portion, at which a width of the region is at a maximum, being 77% to 93% of a length of the electrode center line in order to lower a temperature difference between the higher temperature region and the lowest temperature region at the porous catalyst support.

2. The structural body for supporting a catalyst of claim 1, wherein the gradually decreasing width portions are formed in curved shapes that are convex toward the electrode sides as seen in the orthogonal cross-section.

3. The structural body for supporting a catalyst of claim 1, wherein the porous catalyst support is formed in a shape of an oval whose long axis is the electrode center line as seen in the orthogonal cross-section.

4. The structural body for supporting a catalyst of claim 1, wherein the maximum width portion of the porous catalyst support is formed at an entirety of a portion other than the gradually decreasing width portions.

5. The structural body for supporting a catalyst of claim 1, wherein the porous catalyst support is formed in a shape that is symmetrical across the electrode center line as seen in the orthogonal cross-section.

6. The structural body for supporting a catalyst of claim 1, wherein the porous catalyst support is formed in a shape that is symmetrical across a perpendicular bisector of the electrode center line as seen in the orthogonal cross-section.

7. A catalytic converter, comprising:
the structural body for supporting a catalyst of claim 1, and
a catalyst that is supported by the porous catalyst support of the structural body for supporting a catalyst, and is for purifying exhaust that is discharged from an internal combustion engine.

8. The structural body for supporting a catalyst of claim 1, wherein the width of the maximum with portion is 77% to 85% of the length of the electrode center line.

9. The structural body for supporting a catalyst of claim 1, wherein the porous catalyst support includes a material that contains at least silicon carbide.

10. The structural body for supporting a catalyst of claim 1, wherein the porous catalyst support includes a material that contains at least silicon carbide and metal silicon.

11. The structural body for supporting a catalyst of claim 1, wherein the porosity of the porous catalyst support is in the range of 30% to 60%.

* * * * *